(12) United States Patent
Schnaars et al.

(10) Patent No.: US 7,234,693 B2
(45) Date of Patent: Jun. 26, 2007

(54) BEARING FOR A MOTOR VEHICLE

(75) Inventors: Wolfgang Schnaars, Osnabrück (DE); Karl Heuer, Nortrup (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 177 days.

(21) Appl. No.: 11/104,284

(22) Filed: Apr. 12, 2005

(65) Prior Publication Data
US 2005/0258583 A1 Nov. 24, 2005

(30) Foreign Application Priority Data
Apr. 21, 2004 (DE) .................. 10 2004 019 917

(51) Int. Cl.
*B60G 11/22* (2006.01)
*F16F 1/44* (2006.01)
(52) U.S. Cl. .............. 267/293; 267/140.11; 267/141.3; 267/141.4; 267/141.7
(58) Field of Classification Search ................ 267/292, 267/293, 156, 140.11, 140.13, 141.3, 141.4, 267/141.7
See application file for complete search history.

(56) References Cited

U.S. PATENT DOCUMENTS

| | | | | |
|---|---|---|---|---|
| 1,930,067 A | * | 10/1933 | Tibbetts ................... | 267/141.1 |
| 2,004,712 A | * | 6/1935 | Thiry ......................... | 403/226 |
| 2,962,311 A | * | 11/1960 | Tidd ........................... | 280/687 |
| 3,975,007 A | * | 8/1976 | Chorkey ..................... | 267/152 |
| 4,501,633 A | * | 2/1985 | Zodrow et al. ............. | 156/242 |
| 4,913,411 A | * | 4/1990 | Collins et al. ........... | 267/141.5 |
| 6,202,995 B1 | * | 3/2001 | Jou ............................ | 267/293 |
| 2005/0035506 A1 | | 2/2005 | De Fontenay | |
| 2005/0161872 A1 | * | 7/2005 | Bjorkgard ................... | 267/293 |

FOREIGN PATENT DOCUMENTS

| | | | |
|---|---|---|---|
| DE | 10133319 | | 1/2002 |
| FR | 2830911 | | 4/2003 |
| GB | 228577 | | 6/1936 |
| GB | 653982 | | 5/1951 |
| GB | 2364558 | * | 1/2002 |
| JP | 200 170837 | | 6/2000 |

\* cited by examiner

*Primary Examiner*—Devon Kramer
(74) *Attorney, Agent, or Firm*—Christa Hildebrand; Norris McLaughlin & Marcus, PA

(57) ABSTRACT

Bearing for a motor vehicle, with an inner part 1 with an outer surface 7 having a first undulated contour 10 extending in a longitudinal direction L, an outer sleeve 2 surrounding the inner part 1 and having an inner surface 11 with a second undulated contour 14 extending in the longitudinal direction L, an undulated elastomer body 6 disposed between the two corrugated contours 10, 14 and extending in the longitudinal direction L. The elastomer body 6 connects the inner part 1 with the outer sleeve 2. The two undulated contours 10, 14 do not run equidistant relative to each other.

15 Claims, 4 Drawing Sheets

BEARING FOR A MOTOR VEHICLE

BACKGROUND OF THE INVENTION

The invention is directed to a bearing for a motor vehicle, with an inner part with an outer surface having a first undulated contour extending in a longitudinal direction, an outer sleeve surrounding the inner part with an inner surface having a second undulated contour extending in the longitudinal direction, an undulated elastomer body disposed between the two corrugated contours and extending in the longitudinal direction, whereby the elastomer body connects the inner part with the outer sleeve.

Bearings with an inner part, an outer sleeve surrounding the inner part and an elastomer body arranged between the inner part and the outer sleeve and connecting the inner part with the outer sleeve are known in the art, but disadvantageously exhibit a design-limited spread between the radial stiffness and the axial stiffness. For a high radial stiffness, the values for the axial stiffness are limited due to the high calibration, wherein the term "calibration" refers to a reduction in the diameter of the outer sleeve. The elastomer body is pretensioned in a radial direction by the calibration, so that the radial stiffness can be increased while maintaining a low torsional stiffness. Moreover, an intermediate metal sheet can be inserted which additionally increases the radial stiffness, while providing a low torsional stiffness. However, the axial stiffness is limited to a certain range, so that stop buffers are frequently used to attain a higher axial stiffness for both longitudinal bearing orientations.

To further increase the axis stiffness, bearings of the aforedescribed type been developed which have undulated contours and have been used in the past in motor vehicles. However, the ratios of the characteristic curves for axial stiffness, radial stiffness and torsional stiffness of these bearings also have a limited spread, so that, more particularly, only a certain axial stiffness can be achieved.

It is therefore an object of the invention to provide a bearing which can increase the spread between the ratios of the characteristic curves for axial stiffness, radial stiffness and torsional stiffness.

BRIEF SUMMARY OR THE INVENTION

The object is solved by the invention with a bearing for a motor vehicle having an inner part with an outer surface having a first undulated contour extending in a longitudinal direction (L), an outer sleeve surrounding the inner part and having an inner surface with a second undulated contour extending in the longitudinal direction (L), an undulated elastomer body disposed between the two corrugated contours and extending in the longitudinal direction (L), with the elastomer body connecting the inner part with the outer sleeve, wherein the two undulated contours (10, 14) are not equidistant with respect to each other.

The bearing for a motor vehicle according to the invention includes an inner part with an outer surface having a first undulated contour extending in a longitudinal direction, an outer sleeve surrounding the inner part and having an inner surface with a second undulated contour extending in the longitudinal direction, and an undulated elastomer body disposed between the two corrugated contours and extending in the longitudinal direction. The undulated elastomer body connects the inner part with the outer sleeve. The two undulated contours do not run equidistant with respect to each other.

According to the invention, the two undulated contours are not equidistant to each other, so that they do not have the same relative separation at each location along their longitudinal extent. As a result, a greater spread between the characteristic curves for axial stiffness, radial stiffness and torsional stiffness can be achieved; in particular, the radial stiffness can be adjusted more or less independently. For example, a bearing can be implemented which has a high axial stiffness and a high radial stiffness, while at the same time exhibiting a low torsional stiffness.

If the two undulated contours are formed identically, then the non-equidistance can be achieved, for example, by arranging the outer undulated contour in the longitudinal direction with a relative offset or with relative a phase shift from the inner undulated contour. However, this configuration would increase the axial stiffness in only one direction. For this reason, the two undulated contours are preferably shaped differently, allowing the axial stiffness to be increased in both directions. In particular, with this arrangement, the two undulated contours are in phase, i.e., are not offset relative to each other in the longitudinal direction.

The undulated contours increase the axial stiffness of the bearing and form a compression/thrust buffer with an axial stiffness that depends on the number of undulations, so that the undulated contours can include several wave crests (raised portions) and several wave troughs (indentations). Each undulated contour may have at least one wave crest extending towards the respective other undulated contour, and at least one adjacent wave trough.

The center width of the wave crest and the center width of the wave trough may be different for at least one undulated contour. In particular, the center width of the wave crest may be smaller than the center width of the wave trough.

Preferably, the first undulated contour may include at least one wave crest extending towards the outer sleeve and at least one adjacent wave trough. The center width of the adjacent wave trough may be greater than the center width of the wave crest.

Moreover, the undulated contour of the outer sleeve may include at least one wave crest extending towards the inner part and at least one adjacent wave trough, wherein the center width of the adjacent wave trough may be greater than the center width of the wave crest.

To further increases the axial stiffness, the two undulated contours may mesh with each other and hence overlap in the longitudinal direction. In this way, wedge sections are formed between the two undulated contours in the region of the edges, increasing the axial stiffness.

When the bearing according to the invention is manufactured, the second undulated contour of the outer sleeve may initially be formed as a flat section or omitted entirely, so that the inner part can be easily inserted into the outer sleeve. After the flat undulated or cylindrical outer sleeve, the inner part and the elastomer body have been assembled and, optionally, a vulcanization process required for the elastomer body has been concluded, the diameter of the outer sleeve is reduced so as to completely form the second undulated contour. With this process for reducing the diameter, also referred to as "calibration", the elastomer body can be pretensioned in the radial direction, thereby increasing the radial stiffness of the bearing. The elastomer body can be further pretensioned between the edges in the longitudinal direction by reducing the spacing between the edges of the two undulated contours during calibration, resulting in an increase in the axial stiffness. The torsional stiffness of the bearing can be kept small, possibly even reduced further, so that a large spread in the ratios of the characteristic curves between the axial, radial and torsional stiffness can be achieved by a suitable design of the calibration. In particular, the different shapes of the two undulated contours and their overlap in the longitudinal direction are formed only after calibration.

In addition, the inner part can be formed as a sleeve. In this case, alternatively or in addition to calibrating the outer sleeve, the diameter of the inner part can be expanded. If the undulated contours are not arranged equidistant with respect to each other before the expansion, then expanding the inner part can result in a pretension of the elastomer body that is different in the radial and axial directions, with the effect of spreading the axial and radial stiffness. Moreover, the torsional stiffness of the bearing can be reduced by expanding the inner part.

The inner part and the outer sleeve can be formed as a single part. Alternatively, the inner part may be made of a core and a sheath surrounding the core, with the first undulated contour being formed by the outer surface of the sheath. In this case, the core may include a groove adapted for engagement with the sheath.

When forming the inner part in two separate sections, the sheath can be made of plastic and molded on the finished core. This can save costs, in particular in volume production, because the first undulated contour can be formed without requiring complex machining of the surface of the inner part.

The outer sleeve and the inner part can be arranged eccentrically with respect to each other, so that for example different radial stiffnesses can be achieved in different radial directions. Preferably, however, the inner part and the outer sleeve are arranged concentrically with respect to each other.

The bearing according to the invention is preferably inserted into the bearing eye of a motor vehicle component, with the bearing fixed in the motor vehicle component in the axial direction by an outer shoulder disposed on one end of the outer sleeve. The bearing can be pressed into the bearing eye during assembly until the outer shoulder contacts the peripheral region of the motor vehicle component surrounding the bearing eye.

In addition, an elastomer buffer extending in the longitudinal direction may be arranged on the outer shoulder. More particularly, the elastomer buffer can be arranged on the side of the outer shoulder that faces away from the second undulated contour.

The outer surface of the outer sleeve can have an essentially cylindrical shape. However, the outer surface of the outer sleeve can preferably include a third undulated contour extending in the longitudinal direction, which can be formed, for example, during calibration of the outer sleeve. The second and third undulated contours can then be formed simultaneously by reducing the diameter of the outer sleeve to a different degree at the various locations during calibration.

According to another embodiment of the invention, the outer sleeve can be surrounded by a second outer sleeve with an inner surface having a fourth undulated contour extending in the longitudinal direction, wherein a second undulated elastomer body, which extends in the longitudinal direction, is arranged between the outer sleeve and the second outer sleeve, connecting the outer sleeve and the second outer sleeve with each other. The third and the fourth undulated contour can hereby mesh, creating an overlap between the third and fourth undulated contours in the longitudinal direction.

According to this embodiment, the outer sleeve forms an intermediate part, so that an additional increase in the radial stiffness can be achieved. The second outer sleeve can also be calibrated and, more particularly, can have on its outer surface a fifth undulated contour extending his longitudinal direction.

In all embodiments of the invention, the inner part or the core of the inner part, the outer sleeve and possibly the second outer sleeve can be preferably made of metal, in particular of steel or aluminum. Rubber is used as a preferred elastomer material.

The invention is also directed to a motor vehicle component which includes the aforedescribed bearing, wherein the motor vehicle component includes a bearing eye in which the bearing is inserted.

BRIEF DESCRIPTION OF THE SEVERAL VIEWS OF THE DRAWING(S)

Embodiments of the invention will be described hereinafter with reference to the appended drawings. It is shown in:

FIG. 1 a side view of a first embodiment of the bearing of the invention,

FIG. 2 a top view of the bearing of FIG. 1,

FIG. 3 a side view of the bearing of FIG. 1,

FIG. 4 a cross-sectional view of a motor vehicle component in which the bearing of FIG. 1 is inserted, FIG. 5 a cross-sectional view of a second embodiment of the bearing of the invention, as inserted in a motor vehicle component, FIG. 6 an enlarged view of the detail "X" depicted in FIG. 5, FIG. 7 a perspective view of the bearing of FIG. 5, and FIG. 8 a cross-sectional view of a third embodiment of the bearing of the invention, as inserted in a motor vehicle component.

DETAILED DESCRIPTION OF THE INVENTION

FIG. 1 shows in a side view the first embodiment of the bearing according to the invention, wherein L indicates the longitudinal axis of the bearing. In inner part 1 is here surrounded by an outer sleeve 2 which has an outer surface 3 with an undulated contour 4.

As seen in the top view of FIG. 2, the complete bearing is rotationally symmetric, with the inner part 1 and the outer sleeve 2 being arranged concentrically with respect to each other. The inner part 1 is formed as a sleeve and has a through bore 5. An elastomer body 6 is disposed between the inner part 1 and the outer sleeve 2, connecting the inner part 1 and the outer sleeve 2 with each other.

FIG. 3 shows a cross-sectional view of the first embodiment, wherein the outer surface 7 of the inner part 1 has two raised portions (wave crests) 8 extending toward the outer sleeve 2 and an intermediate indentation (wave trough) 9. As a result, an undulated contour 10 extending in the longitudinal direction L is formed, wherein the center width "b" of the wave crests 8 is smaller than the center width "t" of the wave trough 9. Moreover, an additional indentation "V" is disposed in continuation of the edges of the two wave crests 8 that face away from each other.

The inner surface 11 of the outer sleeve 2 has three raised portions (wave crests) 12 extending toward the inner part 1 and two intermediate indentations (wave troughs) 13, which together form a wave contour 14 extending in the longitudinal direction L. The center width of the wave crests 12 is smaller than the center width of the wave troughs 13. The elastomer body 6 disposed between the two undulated contours 10 and 14 is also undulated in the longitudinal direction L, wherein the two undulated contours 10 and 14 mesh with each other and axially overlap in the longitudinal direction L.

As depicted in FIG. 3, the shape of the undulated contour 10 is different from the shape of the undulated contour 14, so that the two undulated contours 10 and 14 are not equidistant with respect to each other in the longitudinal direction L. In particular, the spacing between the raised portions 8 and the indentations 13 is smaller than the spacing between the indentations 9 and the raised portions 12.

FIG. 4 shows the cross-section of a motor vehicle component 15 with a bearing eye 16, in which the bearing according to first embodiment is inserted. One end of the outer sleeve 2 has an outer shoulder 17, which makes contact with the peripheral region 18 of the motor vehicle component 15 that surrounds the bearing eye 16, so as to axially fix the position of the bearing in one direction. As part of the undulated contour 4, the outer surface 3 of the outer sleeve 2 has in the region of the indentations 13 raised portions 20 which make contact with the inner surface 21 of the bearing eye 16. Moreover, an axial buffer 19, which extends in the longitudinal direction L and is made of an elastomer material, is arranged on the side of the outer shoulder 17 that faces away from the motor vehicle component.

The inner part 1 and the outer sleeve 2 are made of metal. The outer sleeve 2 is calibrated after the vulcanization process of the elastomer body 6 which is made of rubber, so as to achieve a radial pretension in the elastomer body 6. The outer sleeve 2 has a smaller outer diameter in the region of the raised portions 12 than in the region of the indentations 13.

The overlap of the two undulated contours 10 and 14 produces a high axial stiffness in the longitudinal direction, aided by the axial pretension of the elastomer body 6 due to the calibration in the region of the edges "F" of the raised portions 8 (see FIG. 3).

FIG. 5 depicts the second embodiment of the bearing according to the invention, wherein features that are identical or similar to the first embodiment have the same reference characters. The second embodiment is different from the first embodiment only with respect to the design of the inner part 1, which in the second embodiment is formed as two parts.

The inner part 1 has a core 22 made of metal, which is formed as a sleeve and includes on its outer surface a groove 23. A plastic sheath 24 is molded onto the core 22 in the region of the groove 23. The outer surface 25 of the plastic sheath 24 forms the undulated contour 10 (see FIG. 6). Accordingly, the outer surface 25 forms the outer surface 7 of the inner part 1 in the region of the undulated contour 10.

FIG. 6 shows an enlarged view of the detail "X" outlined in FIG. 5, whereas

Figure 1:
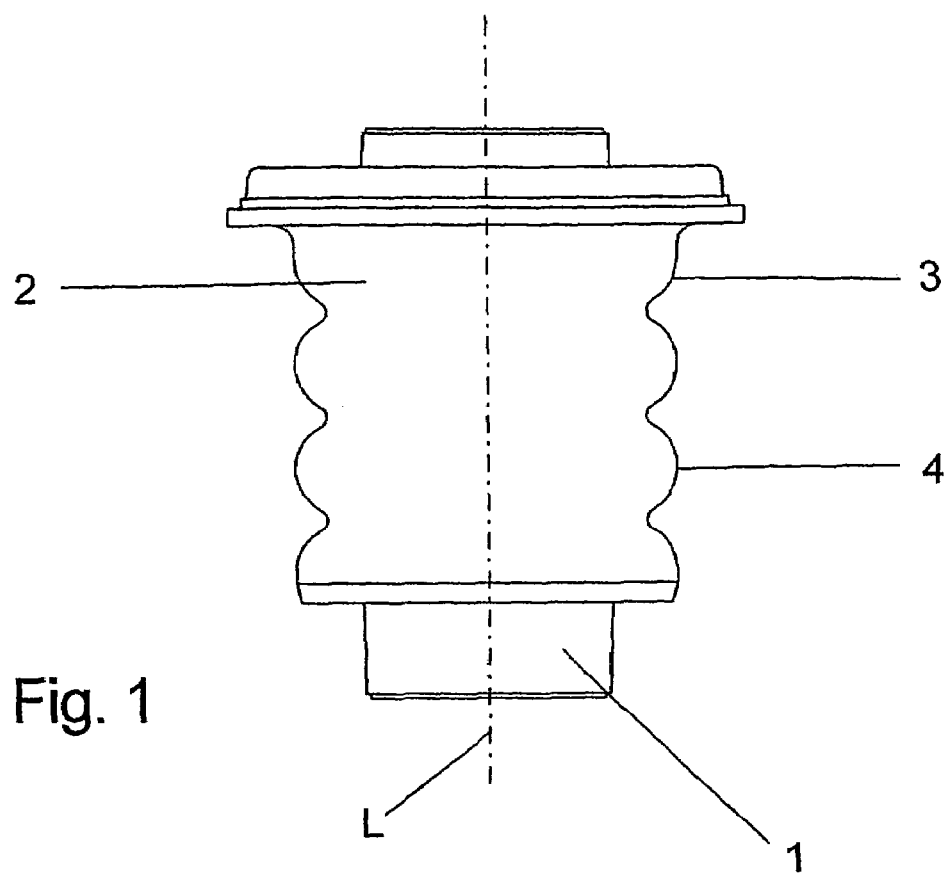
Figure 2:
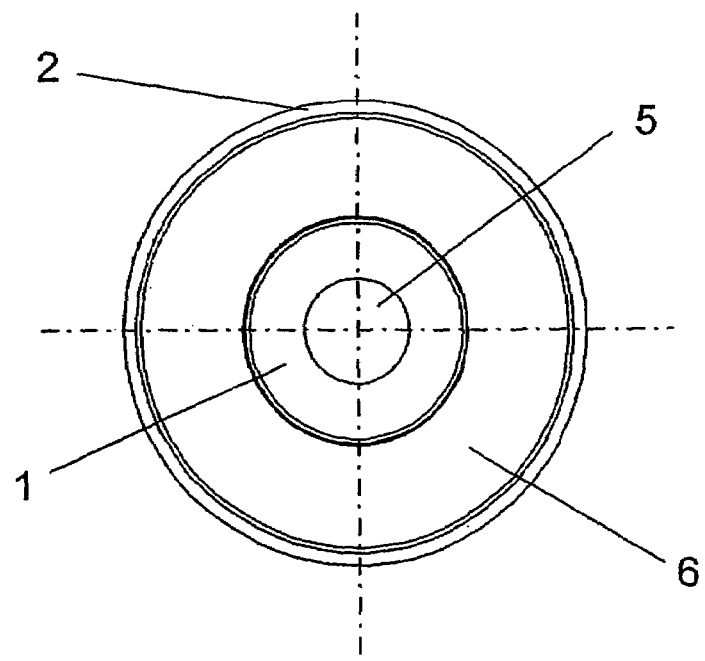
Figure 3:
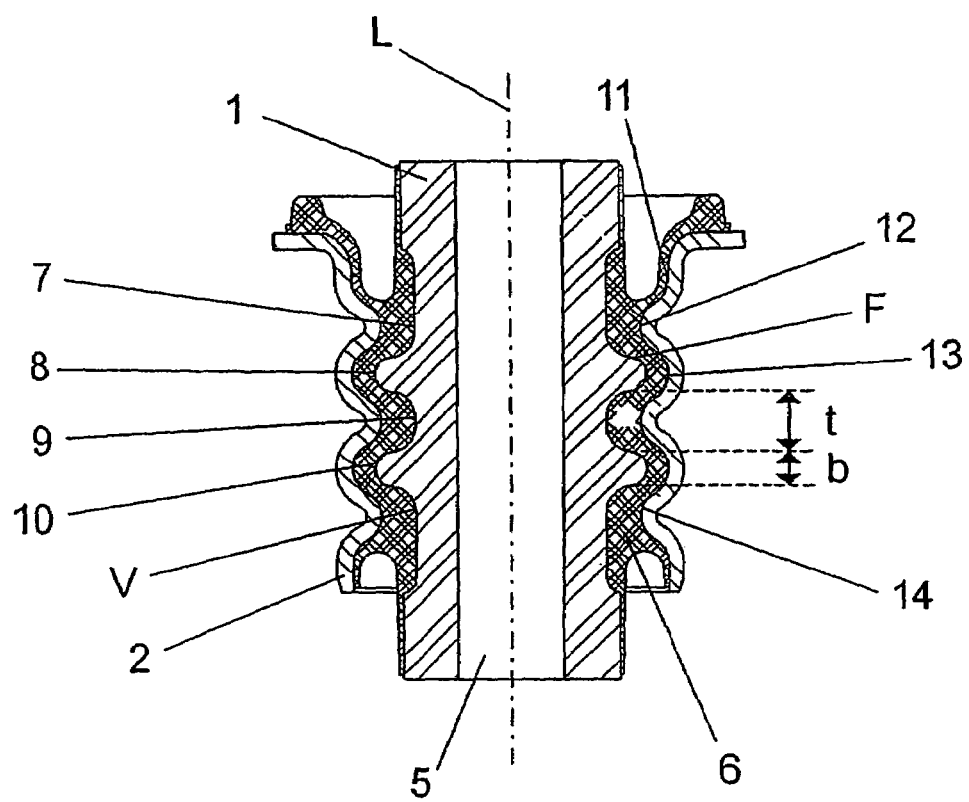
Figure 4:
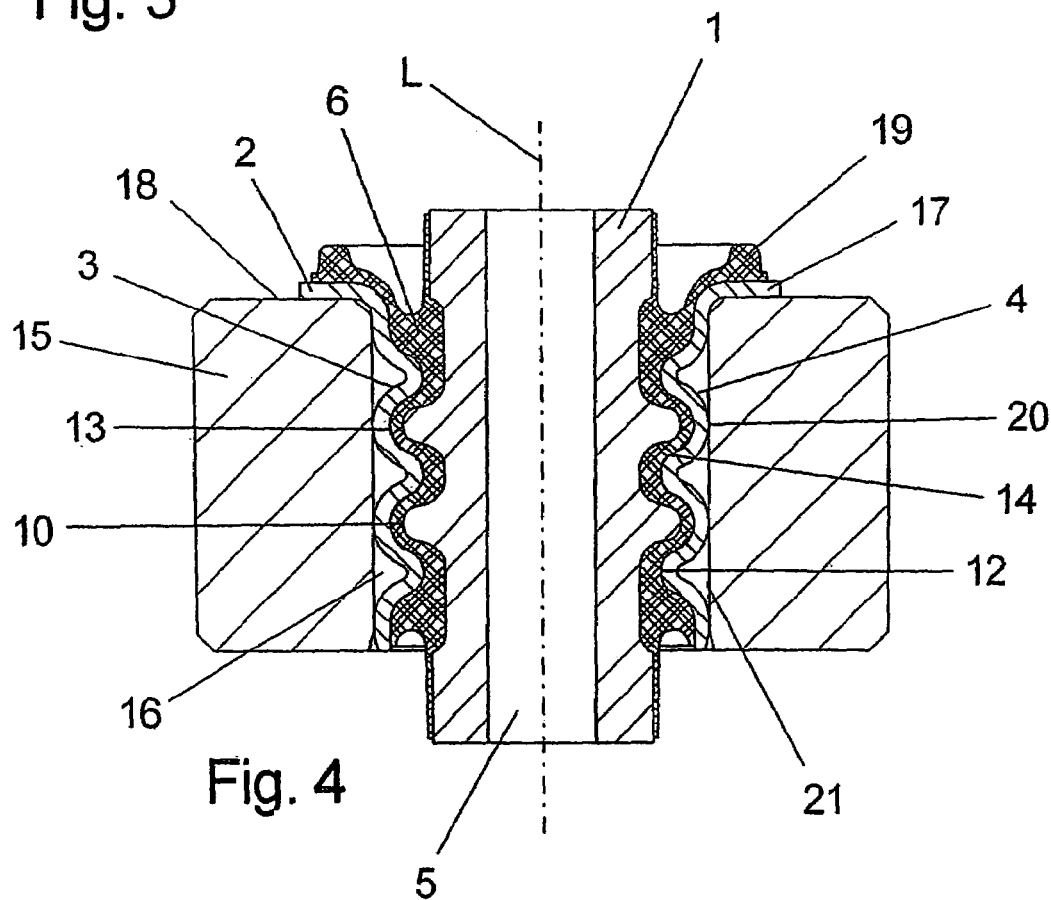
Figure 5:
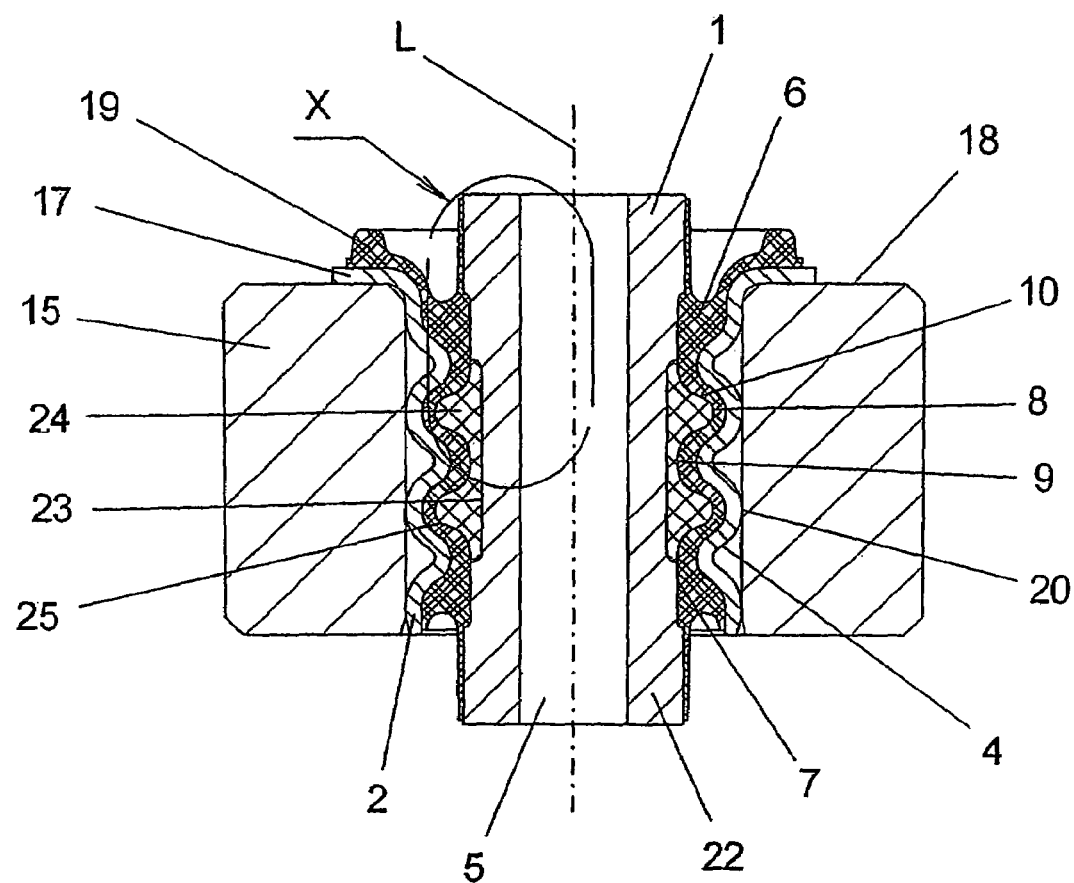
Figure 6:
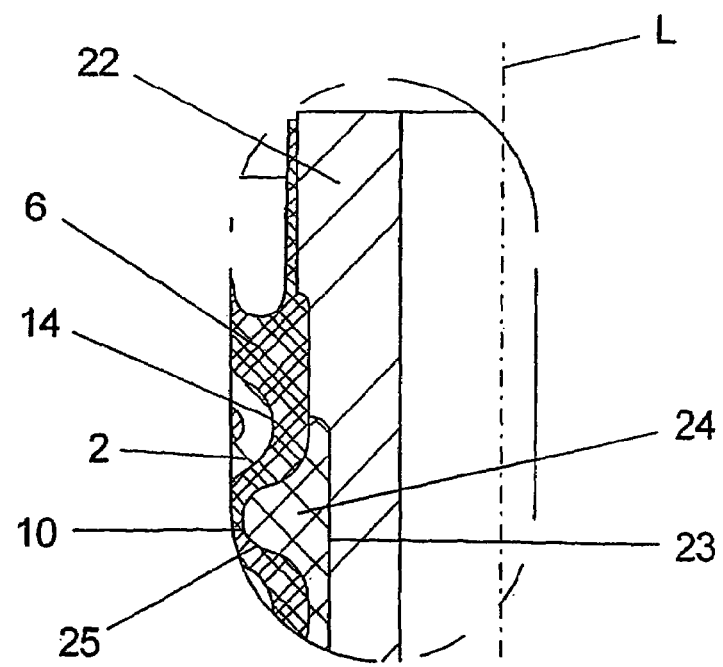
Figure 7:
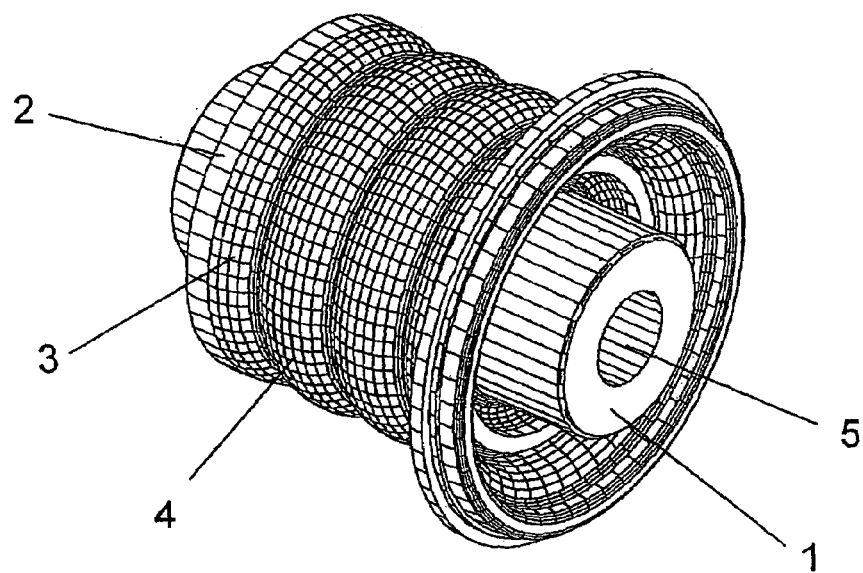
FIG. 7 shows a perspective view of the bearing.
Figure 8:
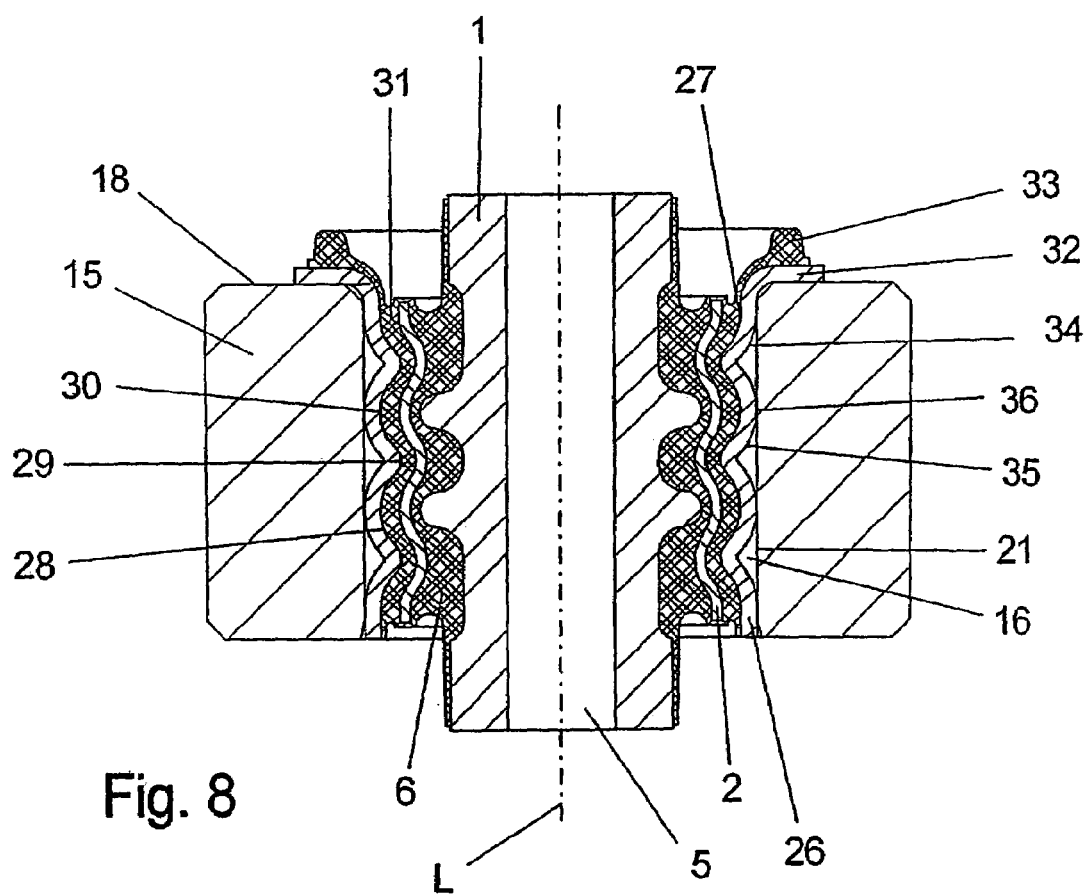
FIG. 8 depicts a third embodiment of the bearing of the invention, whereby features that are identical or similar to the first embodiment have the same reference characters.

The third embodiment is different from the second embodiment in that the outer sleeve 2 is here surrounded by a second outer sleeve 26. The inner surface 27 of the second outer sleeve 26 has an undulated contour 28 that extends in the longitudinal direction L and has raised portions 29 and indentations 30. A second elastomer body 31 with undulations in the longitudinal direction L is disposed between the outer sleeve 2 and the second outer sleeve 26 and connects the outer sleeve 2 with the second outer sleeve 26. The outer sleeve 2 therefore assumes the function of an intermediate sleeve and lacks an outer shoulder with an axial buffer. As shown in FIG. 8, the outer sleeve 2 is completely embedded in a body formed by the elastomer body 6 and the second elastomer body 31.

For axially fixing the bearing in one direction, one end of the second outer sleeve 26 has an outer shoulder 32 which contacts the peripheral region 18 of the motor vehicle component 15 surrounding the bearing eye 16. An axial buffer 33 made of an elastomer material and extending in the longitudinal direction L is arranged on the side of the outer shoulder 32 that faces away from the motor vehicle component 15.

The second outer sleeve 26 is calibrated after the conclusion of the vulcanization process of the two elastomer bodies 6 and 31 which are made of rubber. The outer surface 34 of the second outer sleeve 26 has an undulated contour 35 extending in the longitudinal direction L. The outer surface 34 of the second outer sleeve 26 includes raised portions 36 in the region of the indentations 30. The raised portions 36 make contact with the inner surface 21 of the bearing eye 16.

LIST OF REFERENCE CHARACTERS 1 inner part
2 outer sleeve
3 outer surface of the outer sleeve
4 undulated contour of the outer surface of the outer sleeve
5 through bore in the inner part
6 elastomer body between inner part and outer sleeve
7 outer surface of the inner part
8 raised portions on the outer surface of the inner part
9 indentations on the outer surface of the inner part
10 undulated contour on the outer surface of the inner part
11 inner surface of the outer sleeve
12 raised portions on the inner surface of the outer sleeve
13 indentations on the inner surface of the outer sleeve
14 undulated contour on the inner surface of the outer sleeve
15 motor vehicle component
16 bearing eye of the motor vehicle component
17 outer shoulder of the outer sleeve
18 peripheral region of the motor vehicle component
19 axial buffer on the outer shoulder of the outer sleeve
20 raised portions on the outer surface of the outer sleeve
21 inner surface of the bearing eye
22 core of the inner part
23 groove in the outer surface of the core
24 sheath of the core
25 outer surface of the sheath
26 second outer sleeve
27 inner surface of the second outer sleeve
28 undulated contour on the inner surface of the second outer sleeve
29 raised portions on the inner surface of the second outer sleeve
30 indentations on the inner surface of the second outer sleeve
31 second elastomer body
32 outer shoulder on the second elastomer body
33 axial buffer on the outer shoulder on the second elastomer body
34 outer surface of the second outer sleeve
35 undulated contour on the outer surface of the second outer sleeve 36 raised portions on the outer surface of the second outer sleeve
  t center width of the indentation on the outer surface of the inner part
  b center width of the raised portions on the outer surface of the inner part
  F edge of the raised portions on the outer surface of the inner part
  L longitudinal axis
  X detail
  V 2 additional indentations on the outer surface of the inner part

What is claimed is:

1. A bearing for a motor vehicle, comprising an inner part having an outer surface with a first undulated contour extending in a longitudinal direction,
  an outer sleeve surrounding the inner part and having an inner surface with a second undulated contour extending in the longitudinal direction,
  an undulated elastomer body disposed between the two undulated contours and extending in the longitudinal direction, with the elastomer body connecting the inner part with the outer sleeve,
  wherein each undulated contour has at least one wave crest and at least one adjacent wave trough, with a wave crest of the first undulated contour being aligned in the longitudinal direction with a wave trough of the second undulated contour and a wave crest of the second undulated contour being aligned in the longitudinal direction with a wave trough of the first undulated contour, and wherein for at least one of the undulated contours a center width of the wave crest is smaller than a center width of the wave trough.

2. The bearing for a motor vehicle according to claim 1, wherein the first and second undulated contours (10, 14) are different.

3. The bearing for a motor vehicle according to claim 1, wherein the first and second undulated contours mesh with each other.

4. The bearing for a motor vehicle according to claim 1, wherein the inner part is a sleeve.

5. The bearing for a motor vehicle according to claim 1, wherein the inner part is made of a core and a sheath surrounding the core, with the first undulated contour being formed by the outer surface of the sheath.

6. The bearing for a motor vehicle according to claim 5, wherein the core includes a groove in which the sheath engages.

7. The bearing for a motor vehicle according to claim 1, wherein the inner part and the outer sleeve are arranged concentrically with respect to each other.

8. The bearing for a motor vehicle according to claim 1, wherein one end of the outer sleeve includes an outer shoulder.

9. The bearing for a motor vehicle according to claim 8, wherein an elastomer buffer which extends in the longitudinal direction is arranged on the outer shoulder.

10. A motor vehicle component with a beating according to claim 1, wherein the motor vehicle component comprises a bearing eye in which the bearing is inserted.

11. The bearing for a motor vehicle according to claim 3, wherein the wave crest of the first undulated contour is located within the wave trough of the second undulated contour and the wave crest of the second undulated contour is located within the wave trough of the first undulated contour.

12. The bearing for a motor vehicle according to claim 1, wherein a spacing between the wave crest of the first undulated contour and the wave trough of the second undulated contour is smaller than a spacing between the wave crest of the second undulated contour and the wave trough of the first undulated contour.

13. A bearing for a motor vehicle, comprising:
  an inner part having an outer surface with a first undulated contour extending in a longitudinal direction,
  an outer sleeve surrounding the inner part and having an inner surface with a second undulated contour extending in the longitudinal direction.
  an undulated elastomer body disposed between the two undulated contours and extending in the longitudinal direction, with the elastomer body connecting the inner part with the outer sleeve, wherein each undulated contour has at least one wave crest and at least one adjacent wave trough, with a wave crest of the first undulated contour aligned in the longitudinal direction, with a wave trough of the second undulated contour and a wave trough of the first undulated contour aligned in the longitudinal direction with a wave crest of the second undulated contour,
  wherein the outer surface of the outer sleeve includes a third undulated contour extending in the longitudinal direction, and
  wherein the outer sleeve is surrounded by a second outer sleeve with an inner surface having a fourth undulated contour extending in the longitudinal direction, wherein a second elastomer body, which is undulated in the longitudinal direction, is arranged between the outer sleeve and the second outer sleeve, connecting the outer sleeve and the second outer sleeve with each other.

14. The bearing for a motor vehicle according to claim 13, wherein the third and the fourth, undulated contour mesh with each other.

15. A motor vehicle component with a bearing according to claim 13, wherein the motor vehicle component comprises a bearing eye in which the bearing is inserted.

* * * * *

UNITED STATES PATENT AND TRADEMARK OFFICE
CERTIFICATE OF CORRECTION

PATENT NO.       : 7,234,693 B2
APPLICATION NO.  : 11/104284
DATED            : June 26, 2007
INVENTOR(S)      : Schnaars et al.

It is certified that error appears in the above-identified patent and that said Letters Patent is hereby corrected as shown below:

Column 1, Line 43, "BRIEF SUMMARY OR THE INVENTION" should read
-- BRIEF SUMMARY OF THE INVENTION --

Column 8, Line 4, "with a beating" should read -- with a bearing --

Column 8, Line 31, "longitudinal direction," should read -- longitudinal direction --

Column 8, Line 48, "fourth, undulated" should read -- fourth undulated --

Signed and Sealed this

Twenty-third Day of October, 2007

JON W. DUDAS
*Director of the United States Patent and Trademark Office*